US011412549B2

(12) United States Patent
Roy et al.

(10) Patent No.: US 11,412,549 B2
(45) Date of Patent: Aug. 9, 2022

(54) BROADCAST AND GROUP-BASED HANDOVER IN NR-BASED LEO-NTN

(71) Applicant: MediaTek Singapore Pte. Ltd., Singapore (SG)

(72) Inventors: Abhishek Roy, San Jose, CA (US); Per Johan Mikael Johansson, Singapore (SG); Pradeep Jose, Cambridge (GB); Chia-Chun Hsu, Hsin-Chu (TW); Pavan Santhana Krishna Nuggehalli, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/829,170

(22) Filed: Mar. 25, 2020

(65) Prior Publication Data

US 2020/0314914 A1 Oct. 1, 2020

Related U.S. Application Data

(60) Provisional application No. 62/841,887, filed on May 2, 2019, provisional application No. 62/824,453, filed on Mar. 27, 2019.

(51) Int. Cl.
*H04W 74/08* (2009.01)
*H04W 36/08* (2009.01)
(Continued)

(52) U.S. Cl.
CPC ....... *H04W 74/0833* (2013.01); *H04L 1/1812* (2013.01); *H04W 24/10* (2013.01);
(Continued)

(58) Field of Classification Search
CPC . H04W 74/0833; H04W 76/27; H04W 24/10; H04W 36/0072; H04W 36/08; H04L 1/1812
See application file for complete search history.

(56) References Cited

U.S. PATENT DOCUMENTS

| 2013/0272132 A1 | 10/2013 | Heo et al. ............. H04W 28/08 |
| 2014/0328325 A1 | 11/2014 | Bai et al. ........... H04W 74/0833 |

(Continued)

FOREIGN PATENT DOCUMENTS

| CN | 103167624 A | 12/2011 |
| CN | 104205915 A | 4/2012 |

(Continued)

OTHER PUBLICATIONS

Ericsson ("On HARQ for NTN", 3GPP TSG-RAN WG2 #104, R2-1817764, Nov. 12-16, 2018) (Year: 2018).*

(Continued)

*Primary Examiner* — Chi H Pham
*Assistant Examiner* — Ji-Hae Yea
(74) *Attorney, Agent, or Firm* — Imperium Patent Works; Zheng Jin

(57) ABSTRACT

This innovation describes methods for an NR-based, LEO Non-Terrestrial Networks (NTN) to improve handover process by sending broadcast or group-cast downlink handover (HO) Command message to all (or group of) UEs in the coverage area (cell or beam-spot) of the LEO satellite. Subsequently, on receiving the broadcast (or group-cast) HO Command message, all the UEs in the source cell transmit HO Complete message to the source cell of the LEO-NTN. In order to reduce or avoid heavy Random Access (RA), generating from all the UEs, the LEO-NTN can either send Contention Free Random Access (CFRA), or instruct the UE to perform a random backoff before sending the uplink HO Complete message. Moreover, improvements to configure Conditional Handover (CHO) and delaying the transmission of HO Complete message are also provided.

19 Claims, 4 Drawing Sheets

(51) Int. Cl.
    *H04W 24/10*     (2009.01)
    *H04W 76/27*     (2018.01)
    *H04L 1/18*     (2006.01)
    *H04W 36/00*     (2009.01)

(52) U.S. Cl.
    CPC ....... *H04W 36/0072* (2013.01); *H04W 36/08* (2013.01); *H04W 76/27* (2018.02)

(56) References Cited

U.S. PATENT DOCUMENTS

| | | | |
|---|---|---|---|
| 2015/0319748 A1* | 11/2015 | Huang | H04W 24/08 370/329 |
| 2016/0323800 A1 | 11/2016 | Ulupinar et al. | H04W 36/38 |
| 2018/0006713 A1* | 1/2018 | Hreha | H04B 7/043 |
| 2018/0124739 A1 | 5/2018 | Tabet et al. | H04W 68/00 |
| 2019/0082359 A1* | 3/2019 | Wei | H04W 36/0061 |
| 2020/0245215 A1* | 7/2020 | Han | H04W 36/14 |

FOREIGN PATENT DOCUMENTS

| | | | | |
|---|---|---|---|---|
| EP | 3244671 A1 | 1/2015 | | |
| WO | WO2013067015 A1 | 11/2011 | | |
| WO | WO2017162813 A1 | 3/2016 | | |
| WO | 109417824 A | 3/2017 | | |
| WO | WO2019047969 A1 | 9/2017 | | |
| WO | WO-2019047969 A1 * | 3/2019 | ............ | H04W 74/08 |
| WO | WO-2020124386 A1 * | 6/2020 | ......... | H04B 7/18504 |

OTHER PUBLICATIONS

InterDigital Inc. ("Mobility for Non-Terrestrial Networks", 3GPP RAN WG Meeting #105, R2-1901770, Feb. 25-Mar. 1, 2019) (Year: 2019).*
International Search Report and Written Opinion of International Search Authority for PCT/CN2020/081586 dated Jun. 30, 2020 (10 pages).
Tdoc R2-1903062 3GP TSG-RAN WG2 Meeting #105-Bis, MediaTek Inc., "Handover Enhancement in LEO-Satellite based NTN", Xi'an, China, Apr. 8-12, 2019 (3 pages) *sections 2,3*.
Search Report and Written Opinion of Taiwan IP Office for 109110368 dated Mar. 10, 2021 (8 pages).
R2-1901559, Ericsson, "Connected mode mobility aspects for NTN GEO", 3GPP TSG-RAN WG2 #105, Feb. 15-Mar. 1, 2019 *pp. 1-9, Fig. 1, 2, sections 1, 2.1, 3.1, 3.2, 3.3*.
Search Report and Written Opinion of Taiwan IP Office for 109114536 dated Mar. 12, 2021 (8 pages).
R2-1903057, MediaTek Inc., "Paging Improvement in NR-U", 3GPP TSG-RAN WG2 meeting #105-Bis, Apr. 8, 2019 *pp. 1-10, sections 2, 3*.
Search Report and Written Opinion of application202080002253.6 dated Nov. 15, 2021 (9 pages).
R2-1900545, Ericsson, "Mobility for NTN LEO", 3GPP RAN WG2 Meeting#105, Feb.25-Mar. 1, 2019.
R2-1901770, InterDigital Inc. "Mobility for Non-Terrestrial Networks", 3GPP RAN WG2 Meeting#105, Feb. 25-Mar. 1, 2019.

* cited by examiner

BROADCAST AND GROUP-BASED HANDOVER IN NR-BASED LEO-NTN

CROSS REFERENCE TO RELATED APPLICATIONS

This application claims priority under 35 U.S.C. § 119 from U.S. Provisional Application No. 62/824,453, entitled "Handover Improvement in LEO Satellite-based NTN," filed on Mar. 27, 2019; U.S. Provisional Application No. 62/841,887, entitled "Group Handover and Autonomous Reconfiguration in LEO Satellite-based NTN," filed on May 2, 2019, the subject matter of which is incorporated herein by reference.

TECHNICAL FIELD

The disclosed embodiments relate generally to wireless network communications, and, more particularly, to handover improvement in New-Radio NR-based, LEO Non-Terrestrial Networks (NTNs).

BACKGROUND

There is increasing interest and participation in 3GPP from the satellite communication industry, with companies and organizations convinced of the market potential for an integrated satellite and terrestrial network infrastructure in the context of 3GPP 5G. Satellites refer to Spaceborne vehicles in Low Earth Orbits (LEO), Medium Earth Orbits (MEO), Geostationary Earth Orbit (GEO) or in Highly Elliptical Orbits (HEO). 5G standards make Non-Terrestrial Networks (NTN)—including satellite segments—a recognized part of 3GPP 5G connectivity infrastructure. A low Earth orbit is an Earth-centered orbit with an altitude of 2,000 km or less, or with at least 11.25 periods per day and an eccentricity less than 0.25. Most of the manmade objects in outer space are in LEO. Low Earth Orbit (LEO) satellites orbit around the earth at a high speed (mobility), but over a predictable or deterministic orbit.

In 4G Long-Term Evolution (LTE) and 5G new radio (NR) networks, an evolved universal terrestrial radio access network (E-UTRAN) includes a plurality of base stations, e.g., evolved Node-Bs (eNodeBs) communicating with a plurality of mobile stations referred as user equipment (UEs). In 5G New Radio (NR), the base stations are also referred to as gNodeBs or gNBs. For UEs in RRC Idle mode mobility, cell selection is the procedure through which a UE picks up a specific cell for initial registration after power on, and cell reselection is the mechanism to change cell after UE is camped on a cell and stays in idle mode. For UEs in RRC Connected mode mobility, handover is the procedure through which a UE hands over an ongoing session from the source gNB to a neighboring target gNB.

Mobility in LEO satellite-based NTN can be quite different from terrestrial networks. In terrestrial networks, cells are fixed but UEs may move in different trajectories. On the other hand, in NTN, most of the LEO satellites travel at some speed relative to the earth's ground, while the UE movements are relatively slow and negligible. For LEO satellites, the cells are moving over time, albeit in a predictable manner. Hence, LEO satellites can estimate the target cell based on its own movement speed, direction and height from the ground, instead of relying on UE's measurement reports. Once the LEO satellite moves to a new cell, most (if not all) of the UEs will be handed over to the same target cell. The network can estimate UEs' locations by using Global Navigation Satellite System (GNSS) or by capturing location information from the core networks.

As the cells are continuously moving at a high speed, many UEs will be frequently handed over to the new target cell. Therefore, exploring this deterministic mobility of LEO satellites, and UE's location information (captured from GNSS), network can coordinate with the UEs to improve the handover operation in LEO-NTN. This will help in reducing frequent, periodic handovers and handover signaling load as well.

SUMMARY

This innovation describes methods for an NR-based, LEO Non-Terrestrial Networks (NTN) to improve handover process by sending broadcast or groupcast downlink handover (HO) Command message to all (or group of) UEs in the coverage area (cell or beam-spot) of the LEO satellite. Subsequently, on receiving the broadcast (or groupcast) HO Command message, all the UEs in the source cell transmit HO Complete message to the source cell of the LEO-NTN. In order to reduce or avoid heavy Random Access (RA), generating from all the UEs, the LEO-NTN can either send Contention Free Random Access (CFRA), or instruct the UE to perform a random backoff before sending the uplink HO Complete message. Moreover, improvements to configure Conditional Handover (CHO) and delaying the transmission of HO Complete message are also provided.

In one embodiment, a UE establish a radio resource control (RRC) connection with a source base station (or gNB) in a new radio (NR) based Low Earth Orbit (LEO) Non-Terrestrial Network (NTN). The UE receives a handover command that is broadcasted or groupcasted to multiple UEs by the source base station via an RRC connection reconfiguration message. The handover command comprises a backoff indicator. The UE performs a random-access (RA) procedure over a random-access channel (RACH) with a target base station. The UE applies a random backoff time based on the backoff indicator before transmitting a RACH preamble. The UE receives a random-access response (RAR) for handing over to the target base station.

In another embodiment, a new radio source base station (NR gNB) establishes a radio resource control (RRC) connection with a plurality of user equipments (UEs) in an NR-based Low Earth Orbit (LEO) Non-Terrestrial Network (NTN). The NR gNB groups a number of UEs that are located within a predefined distance with each other into a UE group. The NR gNB configures measurements and reporting parameters and receiving measurement reports from the group of UEs upon a triggering condition is satisfied. The NR gNB broadcasts or groupcasts a handover command message to the group of UEs via an RRC connection reconfiguration message. The handover command message comprises a backoff indicator.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
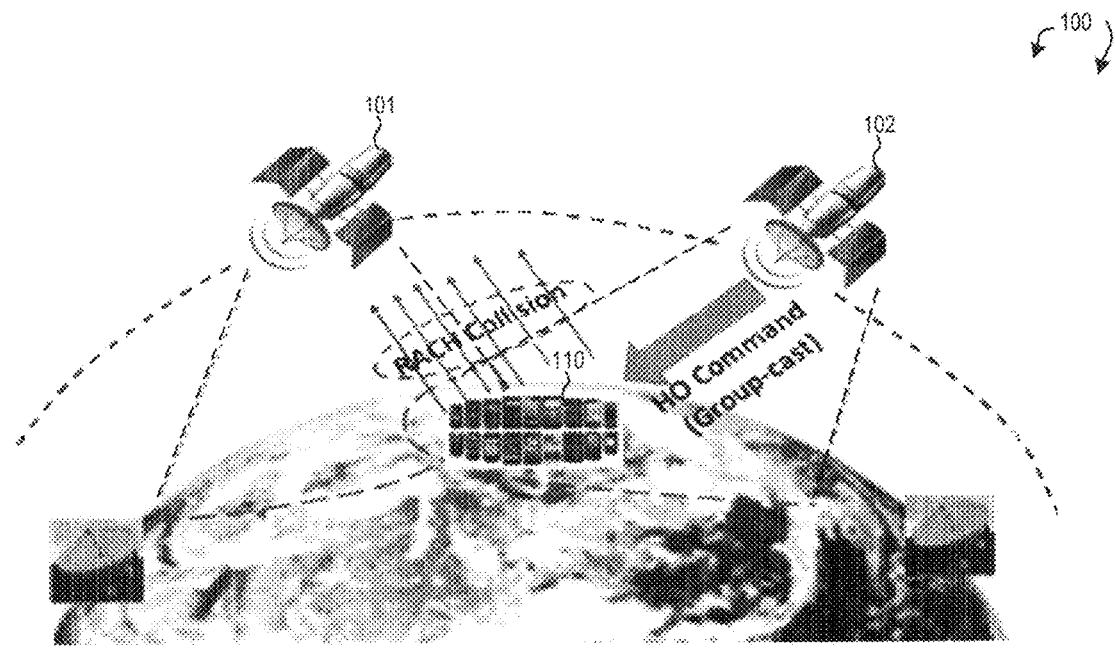
FIG. 1 illustrates an exemplary 5G new radio NR (NR) wireless communication system that supports efficient handover procedure in Low Earth Orbit (LEO) Non-Terrestrial Network (NTN) in accordance with a novel aspect.

FIG. 1 illustrates an exemplary 5G new radio NR(NR) wireless communication system 100 that supports efficient handover procedure in Low Earth Orbit (LEO) Non-Terrestrial Network (NTN) in accordance with a novel aspect. NR wireless communication system 100 comprises a first base station gNB 101, a second gNB 102, and a plurality of user equipments (UEs) 110. In the example of FIG. 1, the base stations gNB 101 and gNB 102 are LEO satellites orbit around the earth at a high speed (mobility), but over a predictable or deterministic orbit. In the example of FIG. 1, the plurality of UEs is initially served in a source cell by LEO satellite gNB 102. Once the LEO satellite moves to a new cell, most of the UEs will be handed over to a new target cell, e.g., served by LEO satellite gNB 101.

Mobility in LEO satellite-based NTN can be quite different from terrestrial networks. In terrestrial networks, cells are fixed but UEs may move in different trajectories. On the other hand, in NTN, most of the LEO satellites travel at some speed relative to the earth's ground, while the UE movements are relatively slow and negligible. For LEO satellites, the cells are moving over time, albeit in a predictable manner. Hence, LEO satellites can estimate the target cell based on its own movement speed, direction and height from the ground, instead of relying on UE's measurement reports. Once the LEO satellite moves to a new cell, most (if not all) of the UEs will be handed over to the same target cell. The network can estimate UEs' locations by using Global Navigation Satellite System (GNSS) or by capturing location information from the core networks.

As the cells are continuously moving at a high speed, many UEs will be frequently handed over to a new target cell. Handover process in NR-based LEO-NTN involve frequent, periodic handover messages. Naturally, UE's measurement-report (MR) based traditional handover will incur frequent, heavy signaling overhead as the network needs to process MR, trigger HO decision and continue HO signaling in every few seconds. Hence, handover process in NR-NTN need further improvement to reduce these frequent, periodic handover events and the associated handover signaling load.

In accordance with one novel aspect, the deterministic mobility of LEO satellites, and UE's location information (captured from GNSS) can be explored, and the network can coordinate with the UEs to improve the handover operation in LEO-NTN. An efficient mechanism to configure and trigger broadcast and group-cast based handover process in LEO-NTN is proposed. The handover process can be further improved to use Conditional Handover, avoid Random Access and delay the HO Complete message transmission. In the example of FIG. 1, source gNB 102 broadcasts (or groupcasts) a downlink HO command message to all (or a group of predetermined) UEs in the serving cell. Measurement reports from the UEs can be skipped or bypassed. Upon receiving the HO command message, each UE starts a random-access procedure, with a random backoff mechanism before sending a random-access preamble, to avoid a "Random Access storm". The subsequent HO complete message can be avoided or delayed.

Figure 2:
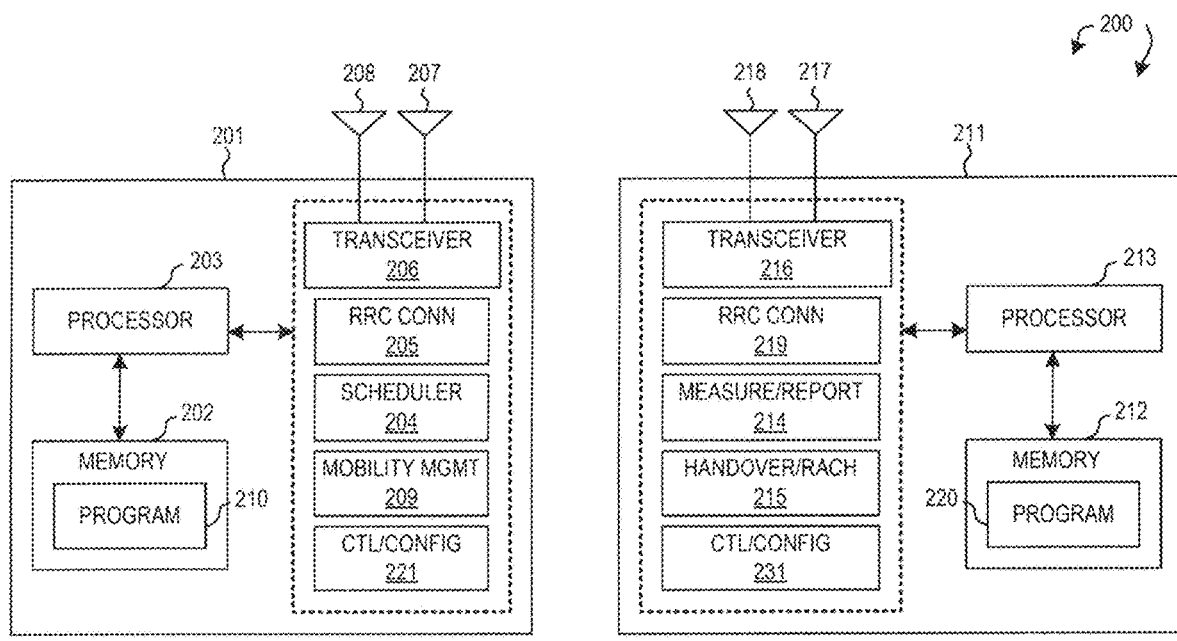
FIG. 2 is a simplified block diagram of a wireless transmitting device and a receiving device in accordance with embodiments of the present invention.

FIG. 2 is a simplified block diagram of wireless devices 201 and 211 in accordance with embodiments of the present invention. For wireless device 201 (e.g., a transmitting device), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a receiving device), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a base station that includes an RRC connection handling module 205, a scheduler 204, a mobility management module 209, and a control and configuration circuit 221. Wireless device 211 is a UE that includes a measurement module 219, a measurement reporting module 214, a handover handling module 215, and a control and configuration circuit 231. Note that a wireless device may be both a transmitting device and a receiving device. The different functional modules and circuits can be implemented and configured by software, firmware, hardware, and any combination thereof. The function modules and circuits, when executed by the processors 203 and 213 (e.g., via executing program codes 210 and 220), allow transmitting device 201 and receiving device 211 to perform embodiments of the present invention.

In one example, the base station 201 establishes an RRC connection with the UE 211 via RRC connection handling circuit 205, schedules downlink and uplink transmission for UEs via scheduler 204, performs mobility management via mobility management module 209, and provides measurement and reporting configuration information to UEs via configuration circuit 221. The UE 211 handles RRC connection via RRC connection handling circuit 219, performs measurements and reports measurement results via measurement and reporting module 214, performs RACH procedure and handover via RACH/handover handling module 215, and obtains measurement and reporting configuration information via control and configuration circuit 231. In accordance with one novel aspect, base station 201 broadcasts (or groupcasts) a downlink HO command message to all (or a group of predetermined) UEs in the serving cell. Upon receiving the HO command message, UE 211 starts a random-access procedure, with a random backoff mechanism to improve handover performance.

Figure 3:
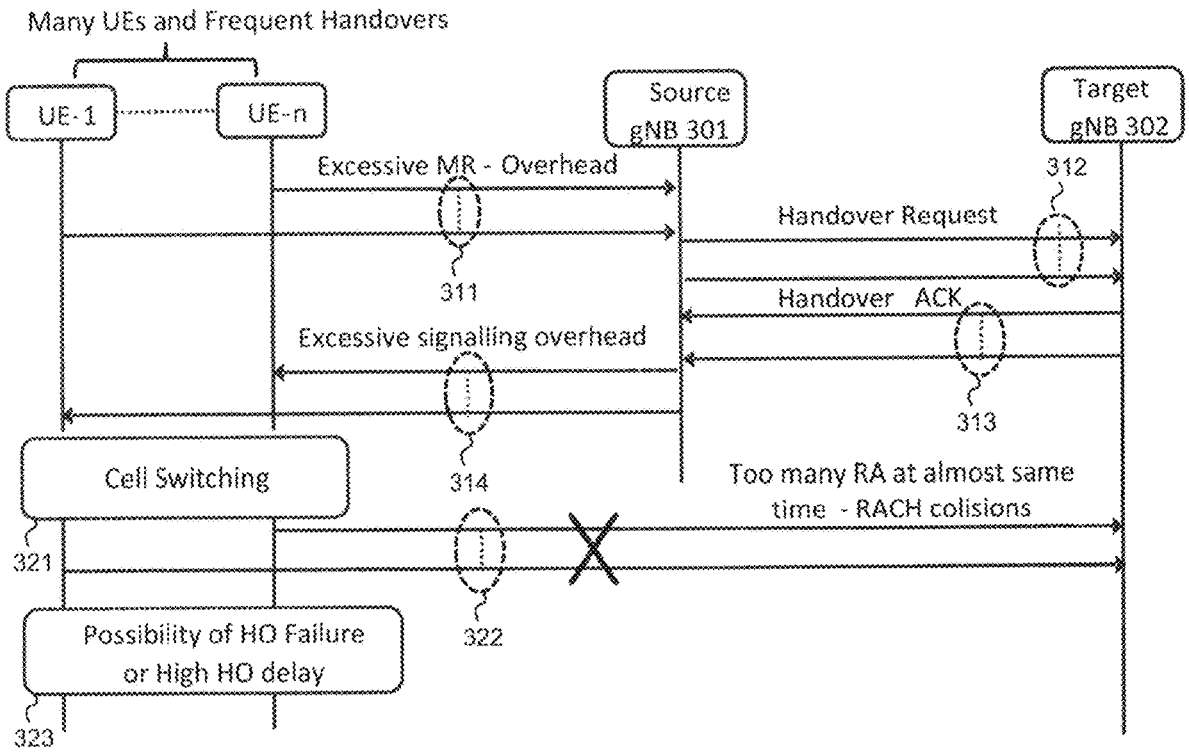
FIG. 3 illustrates a handover procedure between a plurality of UEs and source and target base stations (gNBs) and challenges in NR LEO-NTN.

FIG. 3 illustrates a handover (HO) procedure between a plurality of UEs (UE1-UEn), source base station gNB 301, and target base station gNB 302, and challenges in NR LEO-NTN. Handover process in NR-based LEO-NTN involves many UEs and frequent and periodic handover messages. The measurement report (MR)-based traditional handover will incur frequent and heavy signaling overhead, because the network needs to process the MR and then trigger handover decision, and continue HO signaling in every few seconds. As depicted in FIG. 3, in step 311, excessive MRs are sent from UE1-UEn to their serving base station, source gNB 301. Source gNB processes the MRs, then makes HO decision. In step 312, source gNB 301 sends a handover request to target gNB 302. In step 313, target gNB 302 sends a handover ACK back to source gNB 301. In step 314, source gNB 301 sends HO commands to each of the plurality of UEs, which creates excessive signaling overhead. In step 321, UE1-UEn perform cell switching, e.g., each initiates a random-access channel (RACH) procedure in step 322 by sending a RACH preamble to the target base station gNB 302. When UEs receive the HO commands at the same time, it is likely that UEs will send too many RACH preambles at the same time, generating a "Random Access storm", and causing RACH collisions. In step 323, the UEs may incur possible HO failure or long HO delay.

Based on the challenges described in FIG. 3, handover process in NR LEO-NTN thus needs further improvements to reduce these frequent, periodic handover events and the associated handover signaling overhead. Connected mode mobility and handover in LEO-satellite based NTN can be characterized by the distinct characteristics, mentioned below: 1) In NTN, network can estimate the location information of the UEs by using GNSS based positioning (for GNSS-enabled UEs) or by inferring UEs' locations from the core networks; 2) Due to predictable mobility patterns of satellites, LEO-NTN can estimate the satellites locations over time; 3) Based on the UEs' locations and movement of satellite cells, LEO-NTN can group the UEs which are located in relatively close proximity, e.g., UEs are located within a predefined distance from each other. Thus, based on the above-mentioned characteristics, connected mode mobility in NTN can be improved.

Figure 4:
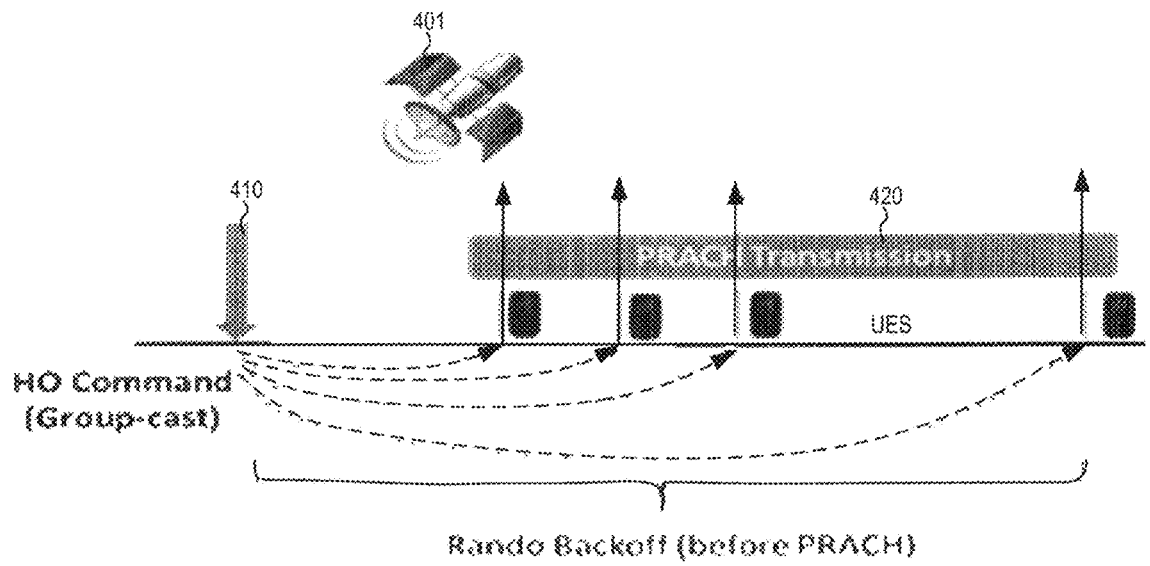
FIG. 4 illustrates a random-access procedure with random backoff supporting mobility in NR LEO-NTN in accordance with one novel aspect.

FIG. 4 illustrates a random-access procedure with random backoff supporting mobility in NR LEO-NTN in accordance with one novel aspect. The main issue of mobility in NR-based LEO-NTN is that frequent and periodic handovers occur to many UEs simultaneously. When UEs receive the HO commands at the same time, it is likely that UEs will send too many RACH preambles at the same time, generating a "Random Access storm", and causing RACH collisions. As a result, the UEs may incur possibility of HO failure or high HO delay. To solve this issue and mitigate enormous RACH collisions, LEO-NTN can provide contention free random-access (CFRA) resources to all (or the group) UEs in serving cell, such that all UEs can respond to the HO command message broadcast. However, CFRA-based random-access is limited by the number of available RA preambles. Thus, it might not be possible to resolve the massive RACH storm and resulting RACH failure in heavily loaded NTN.

In a preferred embodiment, LEO-NTN can avoid the enormous RACH collision, during handover, by including an interval (similar to contention window) in the Handover Command message as a backoff indicator to the UEs in the serving cell. In the example of FIG. 4, serving base station gNB 401 broadcasts or groupcasts an HO Command 410 to a group of UEs in the serving cell. All the UEs of the UE group use the interval in the HO Command message to first generate a random number in the range [0, interval] and then perform a random backoff, before transmitting the PRACH preamble 420 to a target base station in the new target cell. As a result, different UEs of the UE group perform the random-access at different time instances to avoid the massive RACH storm and thereby improving handover performance.

Figure 5:
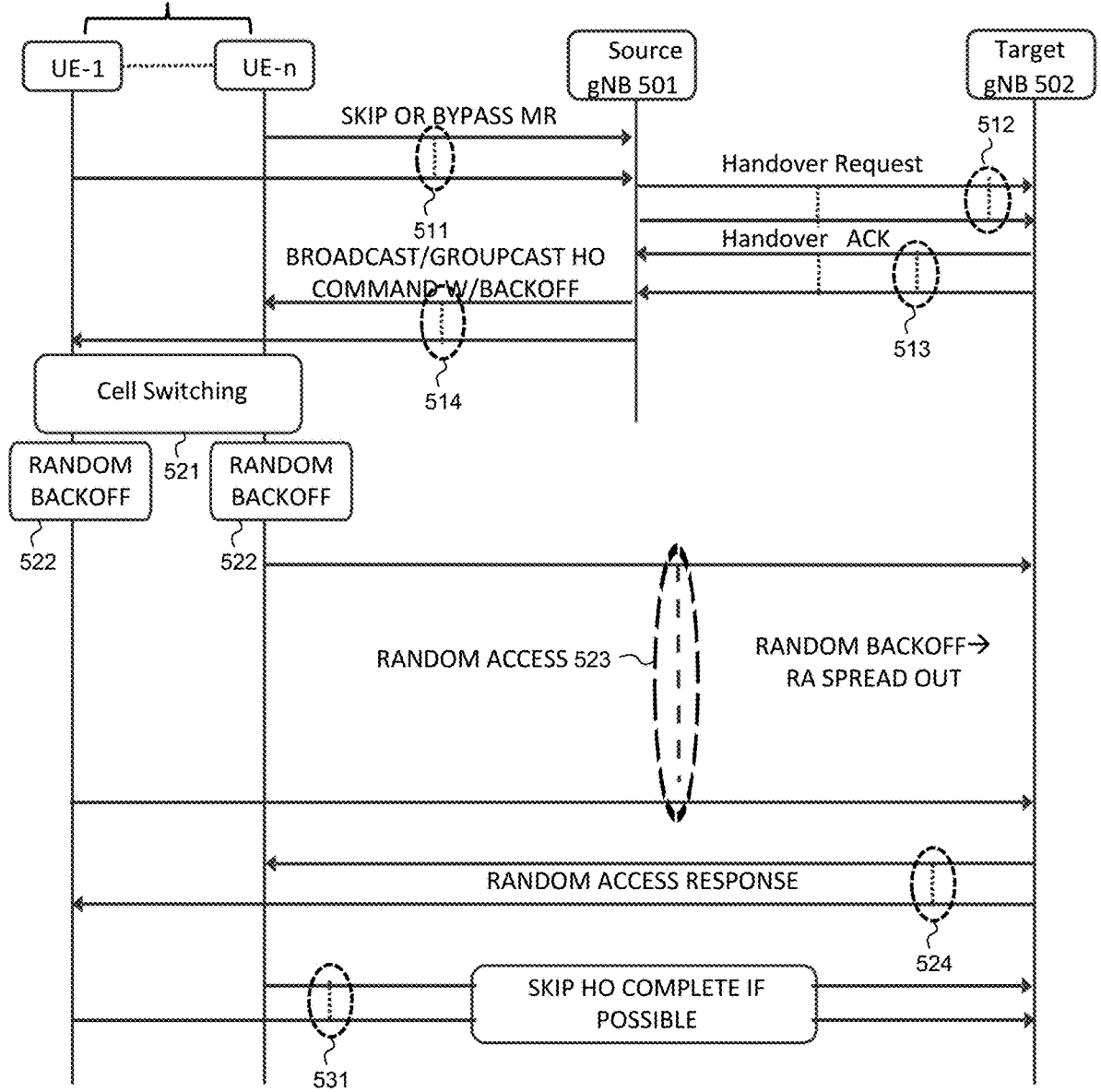
FIG. 5 illustrates a sequence flow between a plurality of UEs and source and target base stations in NR LEO-NTN for performing handover in accordance with one novel aspect.

FIG. 5 illustrates a sequence flow between a plurality of UEs and source and target base stations in NR LEO-NTN for performing handover in accordance with one novel aspect. UE1-UEn belong to a group of UEs that are served by source base station gNB 501 in a serving cell. The UEs are in radio resource control (RRC) connected mode and have established RRC connections with their serving gNB 501. In step 511, UE1-UEn transmit measurement reports (MR) to gNB 501 upon triggering certain conditions. The MR triggering condition can be inhibited, such that no MR is transmitted to reduce signaling overhead. In step 512, source gNB 501 sends a handover request to target gNB 502. In step 513, target gNB 502 sends a handover ACK back to source gNB 501. In step 514, source gNB 501 broadcasts or groupcasts HO command to the group of UE1-UEn. The HO command is carried by an RRC connection reconfiguration message, which can be sent on a separate broadcast or groupcast signaling radio bearer (SRB). The group of UEs (UE1-UEn) are estimated by the network that they are located in relatively close proximity and can be handover from the source base station to the same target base station simultaneously based on the predicable mobility patterns of the satellites.

In step 521, UE1-UEn receive the broadcast or groupcast RRC message and start cell switching (handover to a target cell). The RRC message carries at least an addressing configuration and a security configuration. The security configuration contains a key to be used with legacy PDCP security. The address configuration contains an RNTI for physical downlink control channel (PDCCH) addressing, which is used for scheduling of the broadcast or groupcast RRC message. Each UE does not apply HARQ feedback for the broadcast or groupcast RRC message, and can only apply RLC-UM or RLC-TM for the broadcast or groupcast RRC message.

In one advantage aspect, the HO Command message further includes an interval (similar to contention window). In step 522, all the UEs in the UE group use the interval in the HO Command message to first generate a number in the range [0, interval] and then perform a random backoff. In step 523, each UE then transmits the PRACH preamble to the target base station gNB 502 in the new target cell at different times based on the random backoff number. As a result, different UEs perform the random-access at different times to avoid the RACH storm and thereby improving handover performance. In step 524, the target gNB 502 transmits a random-access response (RAR) to each UE. Note that UEs and LEO-NTN can coordinate to use a two-step contention free random-access (CFRA) or contention based random-access (CBRA) for reducing the handover delay to cope with high-speed LEO satellites.

In step 531, the UEs send HO Complete message to the target gNB 502 to complete the handover procedure. Further improvement in HO signaling can be achieved if the UEs apply the configuration in the DL group RRC message, without explicitly sending the subsequent Confirm or Complete UL RRC message. The UEs can also delay sending a subsequent Confirm or Complete UL RRC message or access procedure following the DL group RRC message, until there is another piece of information that must be transmitted uplink, or until a timer timeout.

In another alternative embodiment, the DL group RRC message can be transmitted to a UE with Conditional Handover (RRC reconfiguration). In Conditional Hand Over (CHO), gNB (eNB) sends the HO Command message with some pre-calculated conditions. UE receives those conditions and does the remaining steps, like cell switching, RA, HO Complete message transmission when those conditions are satisfied. The Conditional Handover (RRC reconfiguration) can include 1) Handover Command, 2) Secondary Cell (SCell) Addition, 3) SCell Removal, 4) SCell PCell (Primary Cell) role switch (similar to HO command), 5) Secondary Cell Group (SCG) addition, 6) SCG removal, and 7) SCG MCG (Master Cell Group) role switch (similar to HO command). In one embodiment, the UE will perform the handover only when a measurement condition or pre-defined time-period is fulfilled. The measurement condition is based on the following: signal strength of a neighbor cell is higher than the serving cell signal strength. Offset and hysteresis additions can be considered optionally. In another embodiment of CHO, UE will report measurement results only when a triggering condition is met. The measurement report triggering condition can be inhibited such that no measurement report is transmitted. The triggering condition involves certain neighbor Physical Cell IDs (PCIs) in specific interval (timer based). Furthermore, any UE in LEO-NTN can ignore the broadcast or groupcast HO command message, if it has already initiated its own HO process.

Figure 6:
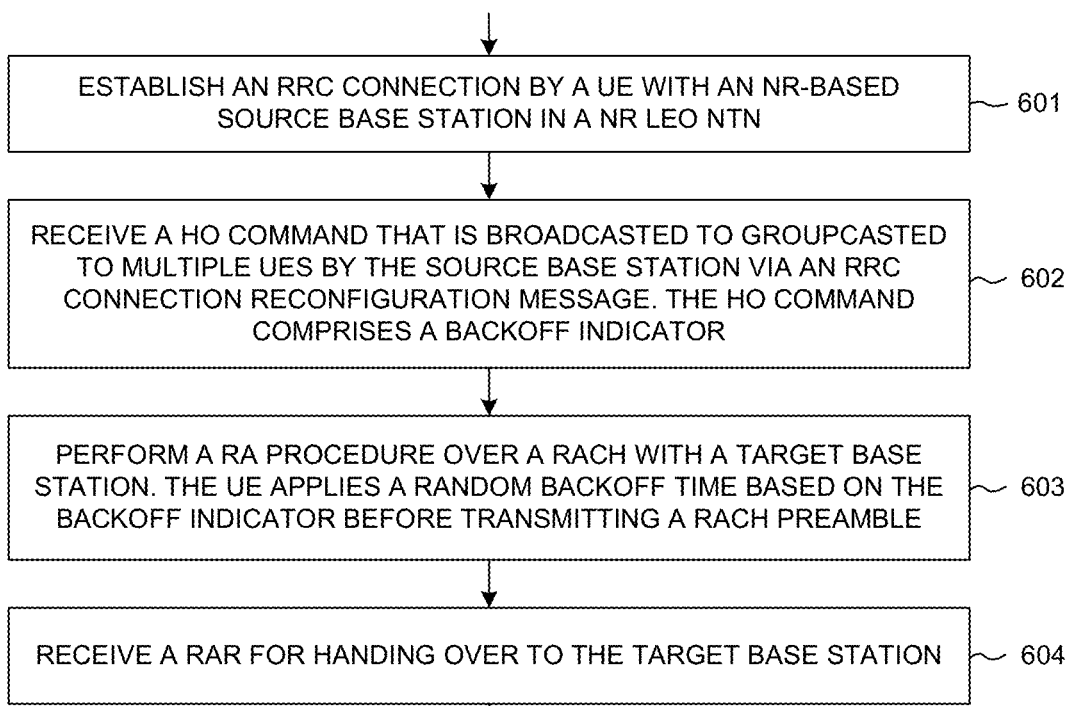
FIG. 6 is flow chart of a method of performing handover from UE perspective in 5G NR-based LEO-NTN in accordance with one novel aspect.

FIG. 6 is flow chart of a method of UE performing handover procedure in 5G NR-based LEO-NTN in accordance with one novel aspect. In step 601, a UE establish a radio resource control (RRC) connection with a new radio source base station (NR gNB) in an NR-based Low Earth Orbit (LEO) Non-Terrestrial Network (NTN). In step 602, the UE receives a handover command that is broadcasted or groupcasted to multiple UEs by the source base station via an RRC connection reconfiguration message. The handover command comprises a backoff indicator. In step 603, the UE performs a random-access (RA) procedure over a random-access channel (RACH) with a target base station. The UE applies a random backoff time based on the backoff indicator before transmitting a RACH preamble. In step 604, the UE receives a random-access response (RAR) for handing over to the target base station.

Figure 7:
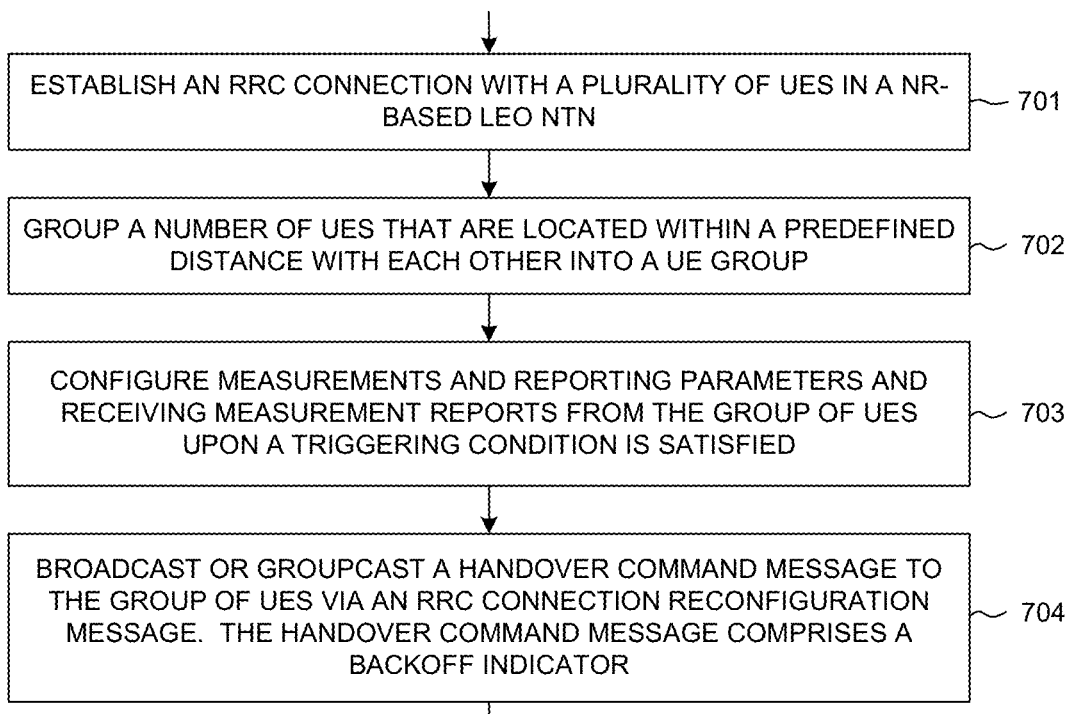
FIG. 7 is a flow chart of a method of performing handover from network perspective in 5G NR-based LEO-NTN in accordance with one novel aspect.

FIG. 7 is a flow chart of a method of performing handover from network perspective in 5G NR-based LEO-NTN in accordance with one novel aspect. In step 701, a new radio source base station (NR gNB) establishes a radio resource control (RRC) connection with a plurality of user equipments (UEs) in an NR-based Low Earth Orbit (LEO) Non-Terrestrial Network (NTN). In step 702, the NR gNB groups a number of UEs that are located within a predefined distance with each other into a UE group. In step 703, the NR gNB configures measurements and reporting parameters and receiving measurement reports from the group of UEs upon a triggering condition is satisfied. In step 704, the NR gNB broadcasts or groupcasts a handover command message to the group of UEs via an RRC connection reconfiguration message. The handover command message comprises a backoff indicator.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   establishing a radio resource control (RRC) connection by a user equipment (UE) with a source base station in a new radio (NR) based Low Earth Orbit (LEO) Non-Terrestrial Network (NTN);
   receiving a handover command that is broadcasted or groupcasted to multiple UEs by the source base station via an RRC connection reconfiguration message, wherein the handover command comprises a backoff indicator indicating a maximum backoff time interval;
   performing a random-access (RA) procedure over a random-access channel (RACH) with a target base station, wherein the UE applies a random backoff time based on the backoff indicator before transmitting a RACH preamble, wherein the random backoff time is derived from the maximum backoff time interval; and
   receiving a random-access response (RAR) for handing over to the target base station.

2. The method of claim 1, wherein the RRC connection reconfiguration message comprises at least an addressing configuration and a security configuration.

3. The method of claim 1, wherein the RRC connection reconfiguration message is sent over a separate broadcast or groupcast signaling radio bearer (SRB).

4. The method of claim 1, wherein the UE does not apply Hybrid Automatic Repeat reQuest (HARQ) for the RRC connection reconfiguration message.

5. The method of claim 1, wherein UE applies configuration provided by the RRC connection reconfiguration message without sending a subsequent confirm or complete RRC message.

6. The method of claim 1, wherein the UE delays sending a subsequent confirm or complete RRC message or delays performing the subsequent random-access procedure until another uplink transmission or until timeout.

7. The method of claim 1, wherein the UE receives the RRC connection reconfiguration message for performing a conditional handover upon satisfying a predefined condition.

8. The method of claim 1, wherein the UE transmits measurement reports to the source base station only when a predefined triggering condition is satisfied.

9. A User Equipment (UE), comprising:
   a radio resource control (RRC) connection handling circuit that establishes an RRC connection with a source base station in a new radio (NR) based Low Earth Orbit (LEO) Non-Terrestrial Network (NTN);
   a receiver that receives a handover command that is broadcasted or groupcasted to multiple UEs by the source base station via an RRC connection reconfiguration message, wherein the handover command comprises a backoff indicator indicating a maximum backoff time interval;

a random-access handling circuit that performs a random-access channel (RACH) procedure with a target base station, wherein the UE applies a random backoff time based on the backoff indicator before transmitting a RACH preamble, wherein the random backoff time is derived from the maximum backoff time interval; and
a handover handling circuit that handovers the UE to the target base station upon receiving a random-access response from the target base station.

10. The UE of claim 9, wherein the RRC connection reconfiguration message comprises at least an addressing configuration and a security configuration.

11. The UE of claim 9, wherein the RRC connection reconfiguration message is sent over a separate broadcast or groupcast signaling radio bearer (SRB).

12. The UE of claim 9, wherein the UE does not apply Hybrid Automatic Repeat reQuest (HARQ) for the RRC connection reconfiguration message.

13. The UE of claim 9, wherein UE applies configuration provided by the RRC connection reconfiguration message without sending a subsequent confirm or complete RRC message.

14. The UE of claim 9, wherein the UE delays sending a subsequent confirm or complete RRC message or delays performing the subsequent random-access procedure until another uplink transmission or until timeout.

15. The UE of claim 9, wherein the UE receives the RRC connection reconfiguration message for performing a conditional handover upon satisfying a predefined condition.

16. The UE of claim 9, wherein the UE transmits measurement reports to the source base station only when a predefined triggering condition is satisfied.

17. A method, comprising:
establishing a radio resource control (RRC) connection by a new radio source base station (NR gNB) with a plurality of user equipments (UEs) in a new radio Low Earth Orbit (LEO) Non-Terrestrial Network (NTN);
grouping a number of UEs that are located within a predefined distance with each other into a UE group;
configuring measurements and reporting parameters and receiving measurement reports from the group of UEs upon a triggering condition is satisfied; and
broadcasting or groupcasting a handover command message to the group of UEs via an RRC connection reconfiguration message, wherein the handover command message comprises a backoff indicator, wherein the backoff indicator includes a maximum backoff time interval for the group of UEs to perform random backoff of a subsequent access procedure.

18. The method of claim 17, wherein the grouping involves estimating UE locations and LEO satellites mobility patterns.

19. The method of claim 17, wherein the triggering condition involves timer-based neighbor Physical Cell IDs (PCIs) in specific interval.

* * * * *